United States Patent [19]

Woodrum

[11] Patent Number: 4,914,066

[45] Date of Patent: Apr. 3, 1990

[54] PELLETS OF CLAY AND SUPERABSORBENT POLYMER

[75] Inventor: Guy T. Woodrum, Chesapeake, Va.

[73] Assignee: Hoechst Celanese Corporation, Somerville, N.J.

[21] Appl. No.: 315,434

[22] Filed: Feb. 24, 1989

[51] Int. Cl.$^4$ .............................................. B01J 20/12
[52] U.S. Cl. ...................................... 502/62; 502/402
[58] Field of Search ................................ 502/62, 402

[56] References Cited

U.S. PATENT DOCUMENTS 4,135,943  1/1979  Morishita et al. ............. 502/402 X
4,591,581  5/1986  Crampton et al. .................. 502/407

*Primary Examiner*—Patrick P. Garvin
*Attorney, Agent, or Firm*—Herbert P. Price

[57] ABSTRACT

Moisture absorbing pellets useful as animal litter are made from a blend of bentonite clay and a solid water-swellable but water-insoluble organic polymeric hydrocolloid.

16 Claims, No Drawings

PELLETS OF CLAY AND SUPERABSORBENT POLYMER

BACKGROUND OF INVENTION

The field of art to which this invention pertains is moisture absorbent particles.

Moisture absorbent particles, such as those used as animal litter, have been made from moisure absorbent clay as described in U.S. Pat. No. 4,704,989. In this patent, clay fines are blended with an aqueous solution of lignin or lignosol and the mixture is converted into partially dried, multi-faceted, bulky aggregates through the action of a pin-type processor.

In U.S. Pat. No. 4,343,751, clay fines, either alone or combined with fly ash, paper sludge, sawdust, peanut shells and the like, are agglomerated into particles.

U.S. Pat. No. 4,591,581 describes a process for manufacturing moisture absorbent particles from clay fines and water dispersible additives having colloidal properties in water.

As described in U.S. Pat. No. 4,258,660, moisture absorbent pellets for use in animal litter have been made from bentonite clay binder plus finely ground straw.

A process for dewatering an aqueous dispersion of clay and agglomerating the clay into particles is described in U.S. Pat. No. 4,222,981. A hydrophobic organic bridging liquid and a liquid conditioner which is effective to displace water from the clay particles are added to an aqueous dispersion of clay. With agitation, the clay particles agglomerate, are separated from the water and dried.

In U.S. Pat. No. 3,935,363, flocculated clay mineral aggregates are used in water absorbing articles.

Moisture absorbent particles used in such applications as animal litter must be capable of absorbing aqueous liquid without fracturing and breaking up, must be able to withstand pressure while wet or dry without fracturing and must not become sticky so as to cling to the animal fur. There is a continuing effort to improve the overall performance of moisture absorbing particles, particularly the ability to absorb large amounts of water.

SUMMARY OF INVENTION

This invention is directed to moisture absorbing particles made from a blend of bentonite clay and a cross-linked organic hydrocolloid. In one aspect, this invention relates to moisture absorbing particles in the form of cylindrical pellets. In another aspect, this invention pertains to a process for forming moisture absorbing particles by a pressure-extrusion process.

The moisture absorbing particles of this invention are made from a blend of a bentonite clay and a solid water-swellable organic polymeric hydrocolloid insoluble in water but capable of absorbing water, wherein the blend is compressed into pellets. The blend contains about 0.5 to about 15 weight percent of the hydrocolloid and about 85 to about 99.5 weight percent bentonite clay, said weight percents being based on the total weight of the hydrocolloid and the clay. Water in the amount of about 5 to about 50 weight percent based on the weight of the hydrocolloid is added prior to the pelletizing step. The addition of amorphous silica to the blend in the amount of about 0.1 to about 5 weight percent based on the weight of the hydrocolloid enables the pelletizing step to be conducted at a faster rate.

The composition of this invention finds wide usage as absorbents for water and various aqueous compositions. A particular use is its use as animal litter, e.g., as kitty litter in cat boxes. Other uses include absorption of aqueous spills, as moisture absorbents in humid environments, as desiccants in the packaging of industrial machinery, as moisture barriers in and around electrical conduit, as barriers around storage tanks for spill containment, as soil conditioners, and the like.

DESCRIPTION OF THE INVENTION

The clay useful in this invention is generally called bentonite clay and was first discovered ner Fort Benton, Wyo. This clay displays strong colloidal properties and, when in contact with water, increases its volume several fold by swelling, giving rise to a thixotropic gelatinous substance. This particular clay found in Wyoming results from the weathering in situ of volcanic ash and consists mostly of montmorillonite. However, the term "bentonite" has been generalized and any clay displaying the properties mentioned above is called bentonite. The bentonite clays are described in detail in Kirk-Othmer "Encyclopedia of Chemical Technology", Second Edition, Volume 3, pages 339–358 (1964), which is hereby incorporated by reference.

The cross-linked hydrocolloids useful in this invention are solid water insoluble but water swellable polymers which are capable of absorbing many times their own weight of water or aqueous solutions. These hydrocolloids are polymers of water soluble acrylic or vinyl monomers (or monomers which when hydrolyzed become water soluble) which are slightly crosslinked with a polyfunctional reactant. Such crosslinked polymers include polyvinylpyrrolidone, sulfonated polystyrene, polysulfoethylacrylate, poly(2-hydroxyethylacrylate), polyacrylamide, polyacrylic acid, polymethacrylic acid, the partial and complete alkali metal salts of the polymeric acids, and the like. Also included as useful hydrocolloids are starch modified polyacrylic acids, hydrolyzed polyacrylonitrile, hydrolyzed polyalkylacrylates, hydrolyzed polyacrylamide and the alkali metal salts of the polymers.

Useful hydrocolloids can be made by polymerizing acrylic acid and starch in an aqueous medium using a polyfunctional monomer, e.g., N,N-alkylene-bis-acrylamide, as the crosslinking agent. This process is described in detail in U.S. Pat. No. 4,076,663. Hydrocolloids can also be made by the process described in U.S. Pat. No. 4,340,706 which involves the inverse emulsion polymerization of acrylic acid followed by crosslinking with a polyfunctional component, e.g., epichlorohydrin. Other useful hydrocolloids and processes for their manufacture are disclosed in U.S. Pat. Nos. 3,669,103, 3,670,731, 4,295,987, 4,587,308 and 4,654,039. All of the patents mentioned in this paragraph are hereby incorporated by reference.

Preferred hydrocolloids are those based on polyacrylic acid, crosslinked with about 0.01 to about 4 weight percent of a polyfunctional crosslinking agent, and partially neutralized with an alkali metal hydroxide to a pH of about 5.5 to about 6.5. Particularly preferred hydrocolloids are those which contain about 3 to about 10 weight percent starch grafted into the polyacrylic acid structure.

The moisture absorbing compositions of this invention are prepared by blending the bentonite clay and the particulate hydrocolloid along with a small amount of water, followed by compressing and extruding the blend to form pellets. The bentonite clay and the hydrocolloid are blended in the weight percent amounts of about 85 to about 99.5 percent clay to about 15 to about 0.5 percent hydrocolloid, said weight percents being based on the total weight of the two components. The preferred amounts are about 90 to about 99 weight percent bentonite clay to about 1 to about 10 weight percent hydrocolloid. The amount of water which is added to the blend will vary from about 5 to about 50 weight percent based on the total weight of the clay and hydrocolloids and preferably about 10 to about 40 weight percent.

The blend compositions are formed into pellets having a cylindrical shape by compression and extrusion in conventional pelletizing apparatus wherein the blend is compressed and extruded through an orifice. The size of the pellets will vary from about 0.1 to about 0.3 inch diameter and about 0.1 to about 1 inch in length. Preferably, the diameter will be about 0.125 to about 0.25 inch and the length will be about 0.25 to about 0.75 inch.

After the pelletizing step, the pellets are dried at room temperature to a moisture content of about 5 to about 12 weight percent or by heating at a temperature up to about 40° C. The pellets are then packaged for shipment.

The pellets of this invention absorb up to 7 times more moisture than pellets made from bentonite clay alone. They also retain their integrity under pressure before and after being exposed to moisture. The surface of the pellets is non-sticky and remains non-sticky even after the maximum amount of moisture is absorbed. The pellets when ground into smaller particles having a particle size of about 0.05 inch to about 0.125 inch can be used as animal litter while retaining the ability to withstand pressure and exposure to moisture without disintegrating or becoming sticky.

It has been found that when a small amount of amorphous silica is added to the blend of bentonite clay and hydrocolloid, the rate at which the pelletizing is conducted can be almost doubled. Any of the amorphous silicas which exist in finely divided form can be used in the process of this invention. Such silica, i.e., silica gel, precipitated silica, and fumed silica, are described in detail in Kirk-Othmer, "Encyclopedia of Chemical Technology", Second Edition, Volume 18, pages 61–72 (1969) which is hereby incorporated by reference. The amount of silica added will vary from about 0.1 to about 5 weight percent, preferably about 1 to about 2 weight percent, said weight percents being based on the weight of the hydrocolloid in the blend.

Various other materials can be mixed with the bentonite clay and the hydrocolloid, such as: chopped fibers, e.g., glass, nylon, polyester, rayon, cotton, etc; hydrophilic liquids, e.g., polyoxyalkylene glycols, such as polyethylene glycol having a molecular weight of 200 to 1000; bulking agents; pigments; dyes; and the like. Generally, these materials will be added in amounts of less than 5 weight percent based on the total weight of the blend.

As has been stated hereinbefore, the cylindrical pellets of this invention are made by a pressure-extrusion process wherein the blend of bentonite clay and hydrocolloid is compressed and extruded through an orifice. These cylindrical pellets have structural integrity before and after exposure to moisture. The pellets can withstand considerable pressure without fracturing, and can absorb a considerable amount of water without disintegrating. When blends of bentonite clay and hydrocolloids are formed into particles by agglomerating process, such as those using a pin-type processor, or a rolling drum, such particles lack structural integrity. Agglomerating processes are size enlargement process which do not involve compression and extrusion.

The following examples describe the invention in more detail. Parts and percentages are by weight unless otherwise indicated.

EXAMPLE A

The hydrocolloids used in the following examples were starch grafted sodium polyacrylates made by the process described in U.S. Pat. No. 4,076,663. These hydrocolloids are manufactured by Hoechst Celanese Corporation and are sold under the Sanwet trademark using the designations IM-1000, IM-1500 and IM-5600. The hydrocolloids have the following properties:

TABLE A

| | Properties of Hydrocolloids | | | | |
| --- | --- | --- | --- | --- | --- |
| | Hydrocolloid | | | | |
| Properties | IM-1000 | IM-1000F | IM-1500 | IM-1500F | IM-5600 |
| Total Absorbency (g/g in 0.9% Saline water) | 65 | 65 | 45 | 45 | 50 |
| Gel Strength (Shear Modulus, dynes/cm$^2$) | 35,000 | 35,000 | 65,000 | 65,000 | 80,000 |
| pH | 6.0 | 6.0 | 6.0 | 6.0 | 6.0 |
| Absorbency Rate (Gel lock up, Sec) | 120 | 120 | 100 | 100 | 60 |
| Particle Size, microns | 75–850 | <75 | 75–850 | <75 | 90–420 |
| Moisture Content % | 8 | 8 | 8 | 8 | 8 |

EXAMPLE 1

A blend was made of 90 parts of bentonite clay and 10 parts of IM 1500F. Water, 2 parts, were sprayed onto the blend and the mass was thoroughly mixed. Pellets were made from the blend using a Model CL Laboratory Pellet Mill (California Pellet Mill Co.). The pellets were compacted and extruded through a ¼ inch diameter die and were cut into 0.5 inch lengths and were dried at room temperature.

The pellets absorbed 0.8 gram of deionized water per gram of pellet in 30 minute. In saline water (0.9 percent saline), 1 gram of pellet absorbed 0.6 gram of saline water in 1 minute and 0.7 gram in 30 minutes. The pellets retained their integrity and did not disintegrate. The surface of the pellets remained non-sticky.

EXAMPLE 2

Using the same procedure described in Example 1, additional pellets were made and evaluated. The compositional data and test results are shown in Tables 1A and 1B. The percent hydrocolloid in Table 1A is based on the weight of clay and hydrocolloid. The percent water is based on the weight of hydrocolloid. The diameter refers to the diameter of the pellets which were cut to a length of 0.5 inch. In Table 1B, "g/g" refers to grams of moisture absorbed per gram of pellet. Pellet Integrity is rated on a scale of 1 to 5 as follows:

| 1 | Excellent | 4 | Poor |
|---|-----------|---|------|
| 2 | Very Good | 5 | Disintegrated |
| 3 | Fair | | |

TABLE 1A

| | Compositional Data | | |
|---|---|---|---|
| | Hydrocolloid | | Water | Diameter |
| Example | Type | % | % | inch |
| 2A | IM-1500F | 1 | 40 | 0.25 |
| 2B | IM-1500 | 10 | 30 | 0.125 |
| 2C | IM-5600 | 10 | 40 | 0.25 |
| 2D | IM-1000* | 10 | 30 | 0.125 |
| 2E | IM-1500F | 10 | 30 | 0.125 |

*0.5% silica

TABLE 1B

| | Test Results | | | |
|---|---|---|---|---|
| | Absorbency D.I. Water | Absorbency 0.9% Saline Water | | Pellet |
| Example | 30 Min. g/g | 1 Min g/g | 30 Min g/g | Integrity |
| 2A | 0.5 | 0.3 | 0.5 | 3 |
| 2B | 3.0 | 1.0 | 1.3 | 2 |
| 2C | 2.0 | 0.6 | 1.0 | 1 |
| 2D | 5.8 | 0.9 | 2.3 | 2 |
| 2E | 9.2 | 1.7 | 3.5 | 1 |

EXAMPLE 3

Using the same procedure described in the previous Examples, additional pellets were made and tested. The compositional data and test results are shown in Tables 2A and 2B.

TABLE 2A

| | Compositional Data | | | |
|---|---|---|---|---|
| | Hydrocolloid | | Water | Diameter |
| Example | Type | % | % | inch |
| 3A | IM-5000F | 20 | 20 | 0.125 |
| 3B | IM-1500F | 20 | 40 | 0.25 |
| 3C | IM-1000F | 10 | 10 | 0.125 |
| 3D | IM-1000F | 10 | 40 | 0.25 |
| 3E | IM-1000F | 20 | 10 | 0.125 |
| 3F | IM-5600 | 10 | 40 | 0.125 |
| 3G | IM-5600 | 20 | 30 | 0.125 |
| 3H | IM-1500 | 10 | 40 | 0.25 |
| 3I | IM-1000 | 10 | 40 | 0.25 |
| 3J | IM-1500 | 10 | 40 | 0.125 |
| 3K | IM-1500 | 10 | 40 | 0.25 |
| 3L | IM-1500F | 10 | 40 | 0.25 |
| 3M | IM-1500F | 10 | 40 | 0.125 |
| 3N | IM-1500F | 1 | 40 | 0.125 |
| 3O | IM-1500F | 3 | 40 | |
| 3P | IM-1500F | 5 | 40 | |

TABLE 2B

| | Test Results | | | |
|---|---|---|---|---|
| | Absorbency D.I. Water | Absorbency 0.9% Saline Water | | Pellet |
| Example | 30 min. g/g | 1 Min g/g | 30 min g/g | Integrity |
| 3A | | 1.0 | | 3 |
| 3B | | 0.9 | 2.6 | 4 |
| 3C | | 1.2 | | 5 |
| 3D | | 0.27 | | 3 |
| 3E | | 1.60 | | 5 |
| 3F | 3.0 | .99 | 1.3 | 1 |
| 3G | 9.2 | 1.7 | 3.5 | 3 |
| 3H | | 0.67 | | 2 |
| 3I | | 0.62 | | 2 |
| 3J | 5.8 | 0.9 | 2.3 | 2 |
| 3K | | 0.71 | | 2 |
| 3L | | 0.73 | 1.0 | 2 |
| 3M | | 0.74 | | 2 |
| 3N | | 0.47 | | 5 |
| 3O | | 0.43 | 0.60 | 5 |
| 3P | | 0.46 | | 5 |

EXAMPLE 4

Using the same procedure described in the previous Examples, additional pellets were made and tested. The compositional data, process conditions and test results are shown in Tables 3A and 3B.

TABLE 3A

| | Compositional Data | | | |
|---|---|---|---|---|
| | Hydrocolloid | | Water | Additives |
| Example | Type | % | % | Kind % |
| 4A | IM-1500F | 1.5 | 31.0 | None |
| 4B | IM-1500F | 1.5 | 31.0 | None |
| 4C | IM-1500F | 1.5 | 35.2 | Silica Gel 2 |
| 4D | IM-1500 | 1.5 | 41.0 | None |
| 4E | IM-1500 | 1.5 | 33.0 | Silica Gel 2 |
| 4F | IM-1500 | 1.5 | 33.0 | Polyester 0.5 Fibers |
| 4G | IM-1500 | 10 | 30.0 | None |
| 4H | IM-1500 | 5 | 31.7 | None |
| 4I | IM-1500 | 10 | 30.0 | Silica Gel 2 |
| 4J | IM-1500 | 10 | 30.0 | Fumed Silica 2 |
| 4K | IM-1500 | 10 | 30.0 | PEG 400 1 |
| 4L | IM-1500 | 10 | 30.0 | Methanol 1 |
| 4M | IM-1500 | 10 | 30.0 | None |
| 4N | IM-1500 | 10 | 20.0 | (2 passes thru Mill) |

TABLE 3B

| | Process Conditions and Test Results | | |
|---|---|---|---|
| | Output Rate | Output Temp | Absorbency D.I. Water |
| Example | lbs/hr | °F. | 30 min g/g |
| 4A | 185 | N.M | 0.36 |
| 4B | N.M | 114 | 0.42 |
| 4C | 257 | 94 | 0.33 |
| 4D | 436 | 96 | 0.40 |
| 4E | 360 | 100 | 0.39 |
| 4F | 237 | 125 | 0.40 |
| 4G | 145 | N.M. | 0.69 |
| 4H | 185 | 137 | 0.54 |
| 4I | 234 | 124 | 0.97 |
| 4J | 185 | 114 | 0.86 |
| 4K | 185 | 122 | 0.72 |
| 4L | 158 | N.M | 0.7 |
| 4M | N.M. | N.M | 0.84 |
| 4N | N.M | N.M | 0.58 |

N.M. = Not Measured

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A moisture absorbing composition comprising a blend of (a) about 0.5 to about 15 weight percent of a solid water-swellable organic polymeric hydrocolloid insoluble in water but capable of absorbing water and (b) about 85 to about 99.5 weight percent bentonite clay, said weight percents being based on the total weight of (a) and (b), wherein (a) and (b) are compressed into pellets.

2. The composition of claim 1 wherein (a) is present in the amount of about 1 to about 10 weight percent and (b) is present in the amount of about 90 to about 99 weight percent.

3. The composition of claim 1 wherein the hydrocolloid is a crosslinked polymer of acrylic acid.

4. The composition of claim 3 wherein the polymer is a graft polymer of starch and acrylic acid.

5. The composition of claim 3 wherein the polymer is partially neutralized with an alkali metal hydroxide.

6. The composition of claim 4 wherein the polymer is partially neutralized to a pH of about 5.5 to about 6.5 with sodium hydroxide.

7. The composition of claim 1 which contains about 0.1 to about 1 weight percent amorphous silica based on the weight of the hydrocolloid.

8. The composition of claim 1 being cylindrical in shape and having a length of about 0.1 to about 1 inch in length and a diameter of about 0.1 to about 0.3 inch.

9. The composition of claim 8 having a length of about 0.25 to about 0.75 inch and a diameter of about 0.125 to about 0.25 inch.

10. A process for forming moisture absorbing pellets which comprises:
    (A) blending
    (1) about 0.5 to about 15 weight percent of a solid water-swellable organic polymeric hydrocolloid insoluble in water but capable of absorbing water;
    (2) about 85 to about 99.5 weight percent bentonite clay wherein said weight percents are based on the total weight of (1) and (2); and
    (3) about 5 to about 50 weight percent water wherein said weight percent is based on the weight of (1);
    (B) compressing and extruding the blend through an orifice to form pellets having a cylindrical shape; and
    (C) drying the pellets.

11. The process of claim 10 wherein the hydrocolloid is present in the amount of about 1 to about 10 weight percent, and the bentonite clay is present in the amount of about 90 to about 99 weight percent.

12. The process of claim 10 wherein the hydrocolloid is a crosslinked polymer of acrylic acid.

13. The process of claim 12 wherein the polymer is a graft polymer of starch and acrylic acid.

14. The process of claim 13 wherein the polymer is partially neutralized with an alkali metal hydroxide to a pH of about 5.5 to about 6.5.

15. The process of claim 10 wherein the blend of hydrocolloid and clay contains amorphous silica in the amount of about 0.1 to about 5 percent based on the weight of the hydrocolloid.

16. The process of claim 10 wherein the orifice has a diameter of about 0.1 to about 0.3 inch.

* * * * *